US012120591B2

(12) United States Patent
Ekl et al.

(10) Patent No.: US 12,120,591 B2
(45) Date of Patent: Oct. 15, 2024

(54) OUTBOUND SMS NOTIFICATIONS TO EMERGENCY CALLERS

(71) Applicant: RapidDeploy, Inc., Austin, TX (US)

(72) Inventors: Reinhard Ekl, Austin, TX (US); Steven Raucher, Austin, TX (US)

(73) Assignee: RapidDeploy, Inc., Austin, TX (US)

( * ) Notice: Subject to any disclaimer, the term of this patent is extended or adjusted under 35 U.S.C. 154(b) by 0 days.

(21) Appl. No.: 17/548,818

(22) Filed: Dec. 13, 2021

(65) Prior Publication Data

US 2022/0191671 A1    Jun. 16, 2022

Related U.S. Application Data

(60) Provisional application No. 63/124,286, filed on Dec. 11, 2020.

(51) Int. Cl.
*H04W 4/90* (2018.01)
*H04W 4/021* (2018.01)
*H04W 4/14* (2009.01)

(52) U.S. Cl.
CPC ............. *H04W 4/90* (2018.02); *H04W 4/021* (2013.01); *H04W 4/14* (2013.01)

(58) Field of Classification Search
CPC .......... H04W 4/90; H04W 4/021; H04W 4/14
See application file for complete search history.

(56) References Cited

U.S. PATENT DOCUMENTS

| 9,712,987 | B2 * | 7/2017 | Chouhan | H04W 4/50 |
| 2010/0190468 | A1 * | 7/2010 | Scott | H04M 1/2745 |
| | | | | 455/404.2 |
| 2010/0191453 | A1 | 7/2010 | Cameron | |
| 2013/0078943 | A1 * | 3/2013 | Biage | H04M 3/00 |
| | | | | 455/404.2 |
| 2015/0237469 | A1 * | 8/2015 | Stephens | H04W 4/029 |
| | | | | 455/404.2 |
| 2015/0312739 | A1 | 10/2015 | Burt | |
| 2016/0029197 | A1 * | 1/2016 | Gellens | H04L 65/65 |
| | | | | 455/404.1 |
| 2019/0098480 | A1 * | 3/2019 | Petite | H04L 51/32 |
| 2019/0342742 | A1 * | 11/2019 | Piett | H04M 3/42357 |
| 2019/0357032 | A1 * | 11/2019 | South | G08B 27/006 |
| 2019/0380020 | A1 | 12/2019 | Pellegrini et al. | |
| 2020/0077250 | A1 | 3/2020 | Gideon, III | |
| 2020/0274962 | A1 * | 8/2020 | Martin | H04W 4/02 |

FOREIGN PATENT DOCUMENTS

WO    2013071157 A1    5/2013

OTHER PUBLICATIONS

International Search Report and Written Opinion in International Patent Application No. PCT/US2021/062757 dated May 4, 2022, 16 pages.

* cited by examiner

*Primary Examiner* — Charles N Appiah
*Assistant Examiner* — Frank E Donado
(74) *Attorney, Agent, or Firm* — Patent Capital Group

(57) ABSTRACT

An emergency system for sending outbound messages to emergency callers receives data signals related to emergency calls that have been answered at a public safety answering point (PSAP) and data signals related to emergency calls that have not been answered. A user of the emergency system can select a geographic area, e.g., an area with a high volume of unanswered calls, and configure a message to be sent to the phone numbers associated with unanswered emergency calls within the geographic area.

17 Claims, 9 Drawing Sheets

OUTBOUND SMS NOTIFICATIONS TO EMERGENCY CALLERS

CROSS REFERENCE TO RELATED APPLICATION

This application claims the benefit of and priority to U.S. Provisional Application No. 63/124,286, filed Dec. 11, 2020, the disclosure of which is hereby incorporated by reference herein in its entirety for all purposes.

BACKGROUND

Public Safety Answering Points (PSAPs) receive emergency calls from the legacy time division multiplexing (TDM)-based Selective Router (SR) network and NG9-1-1 Emergency Services IP Network (ESInet). These calls terminate to 9-1-1 Customer Premises Equipment (CPE) systems or other call handling systems within the PSAPs, and the call handling systems distribute the calls to telecommunicators. CPE systems provide telemetry information for incoming emergency calls, such as various forms of emergency caller location information, call routing actions, Automatic Call Distribution (ACD) events, etc. CPE systems traditionally interface with on-site call taking and computer-aided dispatch (CAD) applications, which operate on servers in the PSAP and connect directly to the CPE system over the local network of the PSAP. After an emergency call has been routed to a particular telecommunicator in the PSAP, the CAD application running on the telecommunicator's workstation displays the call data associated with the emergency call to the telecommunicator.

Traditional on-premise CAD implementations only have access to telemetry information for calls that have been routed to the PSAP and answered by a telecommunicator. Typical CAD workflows typically display call data only after the calls have been assigned to a telecommunicator, which delays the display of information. In addition, typical CAD programs typically only display a call's location to the telecommunicator handling the call. The typical workflows and data availability leave telecommunicators unaware of nearby or unanswered emergency calls, and reduces telecommunicators' overall awareness about emergencies in their regions. The backlog of calls can become large if many individuals are calling about a single, highly-visible emergency.

DESCRIPTION OF EXAMPLE EMBODIMENTS OF THE DISCLOSURE

Overview

Figure 1:
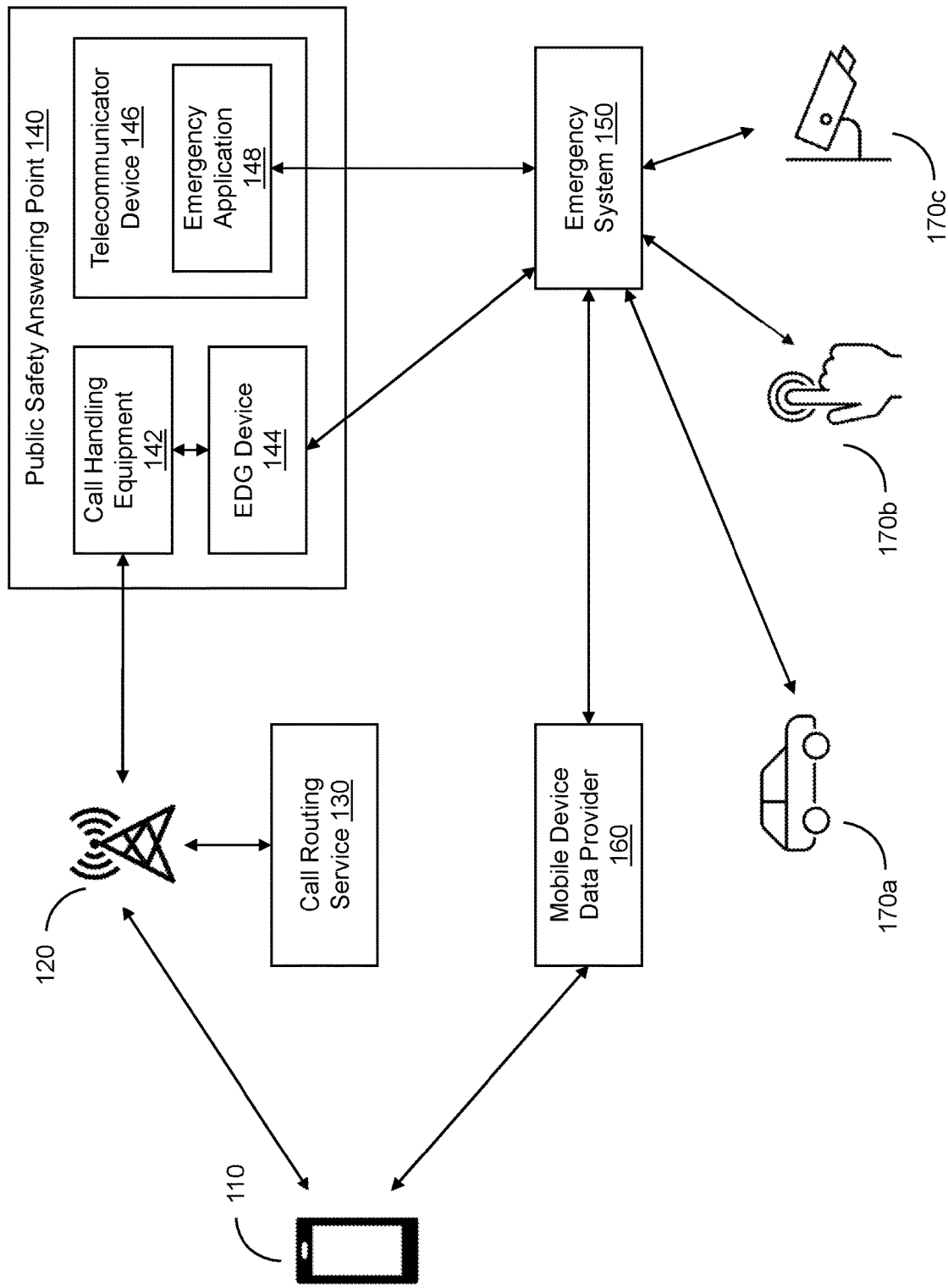
FIG. 1 is a system diagram illustrating an environment of a system for handling emergency calls according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Typical CAD workflows display call data, such as the locations of emergency callers, after the calls have been routed to a PSAP and assigned to a telecommunicator within the PSAP. In addition, typical CAD programs only display a call's location to the telecommunicator handling the call. This delays the display of information about pending, unanswered calls, and reduces telecommunicators' overall awareness about emergencies in their regions.

In certain situations, a single event can prompt a large number of people to place emergency calls. For example, a car crash on a busy road, a fire in a densely populated building or area, or a mass casualty event can cause a lot of observers to dial 9-1-1 at around the same time. If a large public response results in more emergency calls than the telecommunicators at a PSAP can simultaneously respond to, the PSAP can quickly become backlogged. In many instances, callers do not have unique information to report. Answering duplicative calls about the same emergency can increase call wait times for all callers. This can be problematic if callers with unique information about the emergency (e.g., a person who has been injured or otherwise effected and needs assistance) cannot get through to the PSAP, or for callers about unrelated emergencies in the PSAP's coverage area.

The emergency system and methods described herein enable a telecommunicator to send a message to a group of emergency callers who may be reporting the same event. The emergency system receives data signals describing emergency calls or other emergency reporting signals. For example, the emergency system receives call data signals describing calls routed to a particular PSAP, e.g., by a call routing service. The call data signals may describe calls that have been routed to a particular telecommunicator and/or have been answered by the telecommunicator. In addition to the call data signals, the emergency system receives supplemental data signals. Supplemental data signals may be provided by supplemental location providers, e.g., data signals from mobile device providers that may include a device-derived location and phone numbers. In many cases, the emergency system receives supplemental data signals before a call has been answered by a telecommunicator. For example, if ten people place emergency calls within an area of a given PSAP, and telecommunicators at the PSAP have answered two of the emergency calls while the other eight callers are on hold and have not yet been answered, the emergency system receives call data signals from the PSAP's call handling equipment for the two answered calls, and the emergency system receives supplemental data signals with locations and phone numbers for the eight unanswered calls.

The emergency system enables a telecommunicator to send a message to the callers on hold. A user interface provided by the emergency system includes a map and signal indicators, with the signal indicators placed on the map at the locations of the received data signals. For example, the signal indicators show the locations of answered emergency calls and the locations of unanswered emergency calls. The user interface further includes an option for a user (e.g., a telecommunicator) to select a region of the map, such as a region with a relatively large number of unanswered calls. The user interface enables the user to input a message to send to the phone numbers associated with the unanswered emergency calls, e.g., a request to provide further information via text, instructions to hang up, instructions to stay on the line, or some combination of instructions or other information. The emergency system transmits the message to the relevant phone numbers, e.g., via a short message service (SMS) or text message. The message may stay active for a period of time, so that if the emergency system receives a data signal in the selected geographic area for a new emergency call placed after the message was initially sent, the emergency system can automatically send the message to this new caller.

Sending an automated message to multiple callers within the selected region can help reduce duplicate calls about the same incident, as some of the callers may hang up and be removed from the queue. Furthermore, in some embodiments, callers may respond with further information via text. Texting can make it easier for a calltaker to process information from multiple parties asynchronously. The automated message improves the experience and reduce hold times for emergency callers within the selected region, who do not know that the same emergency had already been reported, as well as for users outside the region, who experience shorter hold times if some users hang up and/or correspond via text rather than remaining on hold.

In one aspect, a system for sending outbound messages includes a data ingestion module, a web server, and a messaging interface. The data ingestion module is to receive a data signal comprising a location and a phone number. The web server is to provide a user interface comprising a map and a signal indicator, the signal indicator positioned on the map at the location of the data signal, and receive a user selection of a geographic region on the map, wherein the location of the data signal is inside the selected geographic region. The messaging interface is to receive the selected geographic region from the web server, the selected geographic region associated with a message; determine that the location of the data signal is inside the selected geographic region; and transmit the message to the phone number associated with the data signal In another aspect, a method for sending outbound messages from an emergency system includes receiving a data signal comprising a location and a phone number; providing a user interface comprising a map and a signal indicator, the signal indicator positioned on the map at the location of the data signal; receiving a user selection of a geographic region on the map, wherein the location of the data signal is inside the selected geographic region; receiving a message associated with the geographic region; determining that the location of the data signal is inside the selected geographic region; and transmitting the message to the phone number associated with the data signal. In some aspects, the method for providing a location of an emergency caller is embodied on a non-transitory computer-readable storage medium.

As will be appreciated by one skilled in the art, aspects of the present disclosure, in particular aspects of configuring and sending outbound notifications to emergency callers, described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, circuit designs, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms such as "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. For convenience, if a collection of drawings designated with different letters are present, e.g., FIGS. 2A-2C, such a collection may be referred to herein without the letters, e.g., as "FIG. 2." The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Emergency Call Data Environment

FIG. 1 is a system diagram illustrating an environment of a system for handling emergency calls according to some embodiments of the present disclosure. The system includes a mobile device 110, a cell tower 120, a call routing service 130, a public safety answering point (PSAP) 140, an emergency system 150, a mobile device data provider 160, and secondary data sources 170a-170c. Only one of the mobile device 110, cell tower, call routing service 130, PSAP 140, and mobile device data provider 160 are shown for simplicity; it should be understood that in a working system environment, there may be more of each of these elements.

The mobile device 110 may be a cell phone, a smart phone, a tablet, or another device capable of initiating emergency reporting. The mobile device 110 is a device having a user interface (e.g., a touchscreen, buttons, microphone, speaker, camera, etc.) for interacting with a user and wireless communications circuitry that connects the mobile device 110 to a mobile network to initiate an emergency communication, e.g., to place an emergency call or send a text message. In this example, the mobile device 110 connects to a cellular network via the cell tower 120. In other examples, the mobile device 110 may additionally or alternatively connect to an Internet-based network via a wired or wireless connection (e.g., Wi-Fi), or to one or more other types of networks.

The cell tower 120 is one component of a cellular network that enables wireless communication between mobile devices, and enables communication between wireless devices (e.g., the mobile device 110) and other networked communications devices or systems (e.g., the PSAP 140). Additional cell towers and other networking equipment are directly or indirectly coupled to the cell tower 120 for routing calls placed by mobile devices 110. When a user of the mobile device 110 makes an emergency call, such as a 9-1-1 call, the cell tower 120, or a network element coupled to the cell tower 120, interacts with a call routing service 130. The call routing service 130 may determine an initial location estimate of the mobile device 110 based on the location of the cell tower 120. In some examples, the call routing service 130 may determine the location of the mobile device 110 based on alternative or additional information, such as the location of one or more additional cell towers in range of the mobile device 110, or a location provided by the mobile device 110.

The call routing service 130 routes the emergency call from the mobile device 110 to a particular PSAP 140 based on the initial location estimate. The PSAP 140 may cover a particular geographic region, e.g., a city, a county, a group of counties, a highway system, a park system, etc. The call routing service 130 identifies a PSAP (e.g., PSAP 140) that covers the location estimate of the mobile device 110 by comparing the location estimate of the mobile device 110 to the geographic boundaries associated with a set of PSAPs. The mobile device 110 communicates with telephony equipment in the selected PSAP 140 via the cell tower 120 and additional networking equipment not shown in FIG. 1.

The PSAP 140 is an emergency call handling system. In this example, the PSAP 140 includes call handling equipment (CHE) 142, an emergency data gateway (EDG) device 144, and a telecommunicator device 146 executing an emergency application 148. The CHE 142 receives and handles calls from the telephony network, which includes the cell tower 120. The CHE 142 creates a call event for each received call, such as an emergency call from mobile device 110. The CHE 142 associates call data, such as caller location information, call routing actions, Automatic Call Distribution (ACD) events, and other telemetry data, with the call event. Call data may also include the phone number and contact name of the user of the mobile device 110, class of service, mobile service provider, a time stamp, and other information describing the user, mobile device 110, network, etc. The CHE 142 may output call data in one of a variety of data output formats, such as Automatic Location Information (ALI), Call Detail Record (CDR), or National Emergency Number Association (NENA) i3 Logging.

In the example shown in FIG. 1, an EDG device 144 installed at the PSAP 140 connects to the CHE 142. The EDG device 144 receives the call data from the CHE 142 and parses and formats the call data into a consistent data format. The EDG device 144 connects to an emergency system 150 via a network, such as the Internet, and the EDG device 144 transmits the formatted call data to the emergency system 150 via the network. The call data received at the emergency system 150 from the EDG device 144 is also referred to as a call data signal. The use of an EDG device 144 to transfer call data from a CHE 142 to a cloud-based emergency system 150 is described in U.S. Pat. No. 10,264,122, incorporated by reference in its entirety. In another example, a central CPE host located outside the PSAP 140 receives call information for a group of PSAPs and distributes the call information to a selected PSAP, e.g., PSAP 140. In this example, a multi-tenant emergency call data relay may capture call data from the central CPE host and transmit the captured call data (e.g., as call data signals) to the emergency system 150. The use of the data relay, and the data relay in combination with one or more EDG devices, is described in U.S. patent application Ser. No. 17/070,400, incorporated by reference in its entirety.

The PSAP 140 further includes a telecommunicator device 146. In this example, the telecommunicator device 146 is a computer system operated by a telecommunicator on-site at the PSAP 140. In other embodiments, the telecommunicator device 146 is at a different location from the PSAP 140, e.g., at a backup facility, mobile command center, remote worksite, etc. The telecommunicator device 146 includes the hardware and software needed to display user interfaces, connect to an IP-based network, and detect user input. The telecommunicator device 146 includes an emergency application 148 that allows interaction with the emergency system 150. In one embodiment, the emergency application 148 is a browser that allows a telecommunicator to access a web-based CAD service provided by the emergency system 150. In another embodiment, the emergency application 148 is a dedicated application provided by the emergency system 150 to enable interactions with the emergency system 150. The PSAP 140 may include multiple telecommunicator devices 146, each used by a different telecommunicator. Each telecommunicator device has an associated position number.

The emergency system 150 assists telecommunicators in responding to emergency calls. The emergency system 150 may be a cloud-based processing system embodied on one or more remote servers. While the emergency system 150 is shown as being outside the PSAP 140, in other embodiments, some or all of the functions performed by the emergency system 150 and described herein may alternatively be performed by on-site hardware located within a PSAP 140. Detailed functionality of the emergency system 150 is described with respect to FIG. 2.

The emergency system 150 receives the call data signals from the EDG device 144, processes the call data signals, and generates user interfaces for display by the emergency application 148. While one PSAP 140 is shown in FIG. 1, as noted above, the environment may include many similar PSAPs, and the emergency system 150 may receive call data signals from many PSAPs, e.g., from EDG devices 144 installed across many PSAPs. In addition, the emergency system 150 may receive call data signals from one or more multi-tenant emergency call data relays at one or more central emergency call handling hosts.

The emergency system 150 also receives supplemental data signals from one or more supplemental data sources. The call data signals and supplemental data signals are referred to jointly as "data signals." The supplemental data sources are separate from the PSAP 140, and in particular, separate from the CHE 142 and EDG device 144 which provide the call data signals described above. The supplemental data signals provided by the supplemental data sources include data describing emergencies that reaches the emergency system 150 through one or more alternate pathways. Example supplemental data sources include the mobile device data provider 160 and the secondary data sources 170a-170c shown in FIG. 1. Some or all supplemental data signals may include location information. Some or all supplemental data signals may include contact information, such as a phone number. Some or all supplemental data signals may include alternative or additional data that can be used to correlate the supplemental data signal to an emergency call, such as phone number, name, time stamp, location, etc. Additional and alternative supplemental data that may be included in a supplemental data signal are described below.

The mobile device data provider 160 provides supplemental data signals related to the mobile device 110 making an emergency call. The supplemental data signals may include the location of the mobile device 110, frequent or saved locations of the mobile device 110, identifying information of the mobile device 110 (e.g., telephone number, customer name), a primary language of the customer and/or mobile device 110, medical history information, car crash detection data, a time stamp, and any other information that may be useful to the emergency system 150, a telecommunicator, and/or an emergency responder. In some embodiments, the mobile device data provider 160 automatically transmits the supplemental data signals to the emergency system 150 in response to an emergency call being placed by the mobile device 110. In some embodiments, the mobile device data provider 160 transmits the supplemental data signals in response to a query from the emergency system 150.

The mobile device data provider 160 may be a web server associated with a mobile device provider. For example, the mobile device data provider 160 is operated by a mobile phone company that programs the mobile device 110 to transmit its location to the mobile device data provider 160 when a user of the mobile device 110 initiates an emergency communication (e.g., when the user places an emergency call or sends an emergency text message). As another example, a mobile device data provider 160 is operated by a software provider whose software executes on the mobile device 110 and accesses the user device's location. In still another example, the mobile device data provider 160 is implemented by the mobile device itself 110, e.g., as a software module of the mobile device 110. In this example, the mobile device 110 is programmed (e.g., by a mobile device provider or software provider) to transmit its location and/or other supplemental data directly to the emergency system 150 in response to the user initiating an emergency communication. The system environment may include multiple mobile device data providers 160 associated with different mobile device providers, different mobile networks, and/or different software providers.

During an emergency call, the mobile device data provider 160 retrieves real-time location information from the mobile device 110 and transmits the location of the mobile device 110 to the emergency system 150 in a supplemental data signal. The mobile device 110 may determine its location based on, for example, GPS signals, WiFi signals, Bluetooth signals, cell towers, or other signals, or a combination of signals. The device-derived locations included in the supplemental data signals are typically more accurate and precise than the location provided in the call data, e.g., the locations based on cell phone towers used for routing calls. In addition, due to lags in existing call handling infrastructure, the device-derived locations are also typically available to the emergency system 150 faster than the call data, and faster than the device-derived locations are currently provided to on-site CAD system. Furthermore, the mobile device data provider 160 can continue to provide updated locations throughout an emergency call as the mobile device 110 moves location.

In addition to mobile devices, other secondary data sources 170 may provide location data and/or other data about emergencies to the emergency system 150. While the secondary data sources 170 are illustrated as being in communication with the emergency system 150, data from the secondary data sources 170 may be transmitted from the secondary data sources 170 to the emergency system 150 via additional servers or other communications networks and devices, similar to the mobile device locations being passed to the emergency system 150 by the mobile device data provider 160.

Three example types of secondary data sources are illustrated in FIG. 1. The first example secondary data source 170a represents a vehicle data source. For example, the secondary data source 170a includes a vehicle communication provider that provides the location of the vehicle and vehicle condition information (e.g., whether a crash was detected) to the emergency system 150. A vehicle connected to the vehicle communication provider may alert the vehicle communication provider to an emergency in response to a user action (e.g., a user pressing a button in the vehicle) or automatically (e.g., in response to an automatic crash detection). The vehicle communication provider may send to the emergency system 150 a supplemental data signal that includes the location of the vehicle, the vehicle condition information, and a phone number associated with the vehicle (e.g., the vehicle owner's cell phone number) or a phone number associated with the vehicle communication provider.

The second example secondary data source 170b represents a panic button data source that provides the location of a user who pressed a panic button to the emergency system 150. A panic button provider may provide a supplemental data signal to the emergency system 150 describing the user (e.g., medical history information) and, if available, the type of emergency (e.g., that the user reported a fall or a home invasion). The supplemental data signal may further include, if available, a location of the user and a phone number associated with the user.

The third example secondary data source 170c is a connected security system that may include one or more of a smart doorbell, a camera, a motion sensor, a fire detector, etc. In response to a user-initiated or automatically detected emergency, a home security service that manages the connected security system may provide a supplemental data signal that includes an address where the security system is located, any available real-time video, and other security data (e.g., lock tamper attempts, alarm triggers, etc.) to the emergency system 150. The supplemental data signal may further include a phone number associated with the security system (e.g., a homeowner's cell phone number) or a phone number associated with the security system.

The emergency system 150 may receive additional or alternative supplemental data signals from other types of secondary data sources besides those described above.

The emergency system 150 aggregates supplemental data signals received from the supplemental data sources 160 and 170 and call data signals received from PSAPs, such as the PSAP 140. For example, for a given call, the emergency system 150 receives call data from the EDG device 144, including the telephone number of the mobile device 110, and a supplemental data signal from the mobile device data provider 160 that includes a real-time location of the mobile device 110. By aggregating data signals from the PSAPs and supplemental data providers, the emergency system 150 can provide a more complete picture of the emergencies within the jurisdiction of a given PSAP 140 than prior systems. In some cases, a supplemental data signal regarding a given emergency call may arrive at the emergency system 150 sooner than the call data signal from a PSAP 140. For example, if a call is queued at the PSAP 140 and has not been assigned to a telecommunicator, the CHE 142 may not output any call data. In this case, the mobile device data provider 160 may provide caller information, including the location of the caller and the phone number of the caller, to the emergency system 150 faster than the CHE 142 outputs the call data.

Example Emergency System

Figure 2:
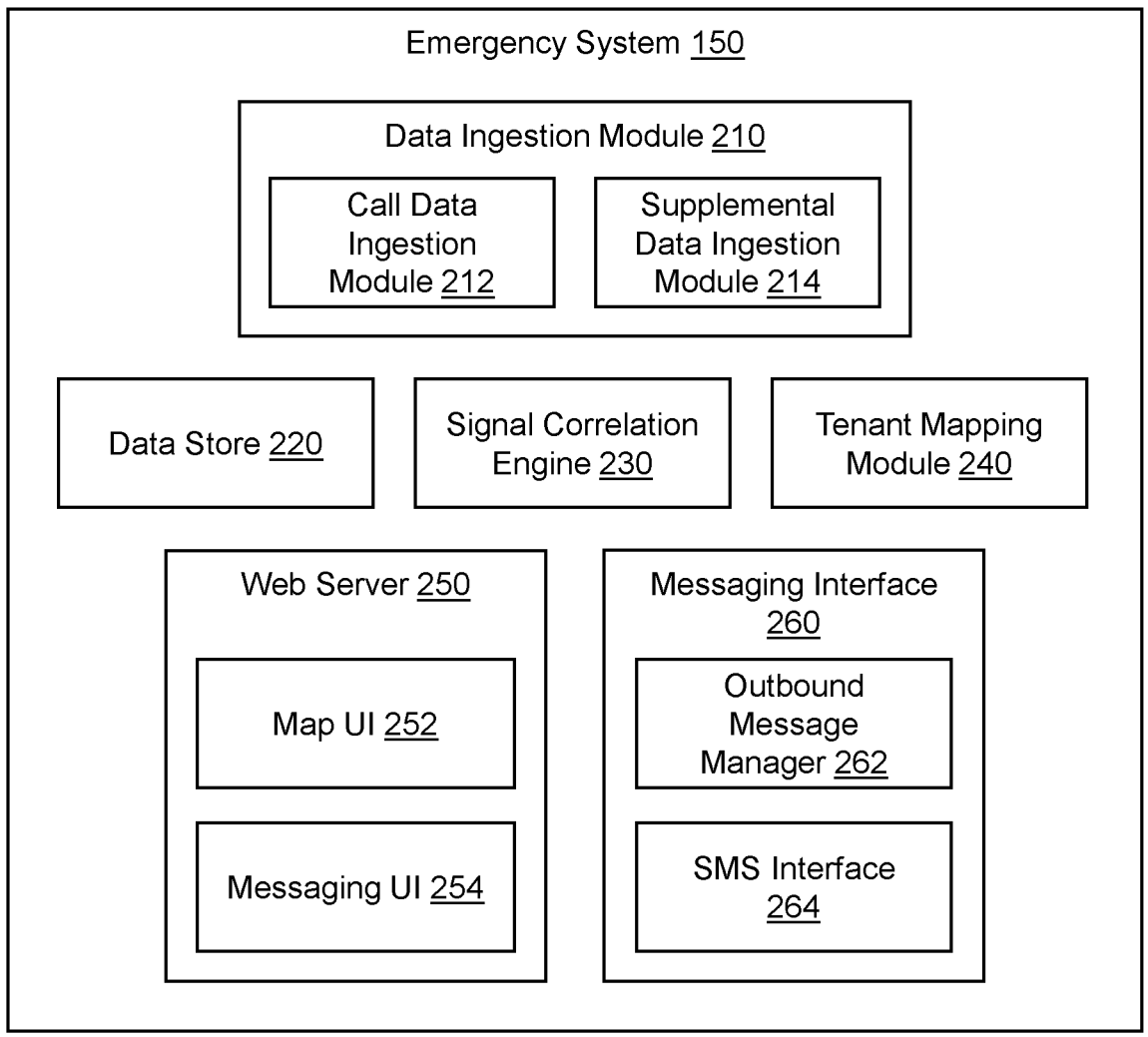
FIG. 2 is a block diagram of the emergency system according to some embodiments of the present disclosure.

FIG. 2 is a block diagram of the emergency system 150 according to some embodiments of the present disclosure. The emergency system 150 includes a data ingestion module 210, a data store 220, a signal correlation engine 230, a tenant mapping module 240, a web server 250, and a messaging interface 260. In alternative configurations, different and/or additional components may be included in the emergency system 150. Additionally, functionality described in conjunction with one or more of the components shown in FIG. 2 may be distributed among the components in a different manner than described in conjunction with FIG. 2 in some embodiments.

In one embodiment, the emergency system 150 is a cloud-based computer-aided dispatch (CAD) system that manages a CAD service that provides information about emergency calls and first responders to telecommunicators and enables telecommunicators to connect to first responders and dispatch first responders to the locations of emergencies. The cloud-based CAD system processes call data signals and supplemental data signals and provides information about an emergency caller to a telecommunicator via the emergency application 148. The cloud-based CAD system may also receive information from the emergency application 148 input by the telecommunicator, e.g., additional information about a caller, selections for responding to the call, information about first responders who were dispatched, etc. In another embodiment, the emergency system 150 is an emergency call mapping interface that provides data about emergencies in a region (e.g., the jurisdiction of a PSAP 140 or a region including the jurisdiction) on a real-time map. In still another embodiment, the emergency system 150 is a call analytics system that performs analysis on received emergency calls based on the call data signals and supplemental data signals. Each of these systems may be configured to receives a selection of emergency callers (e.g., a geographic area including one or more emergency callers) and an outbound message to transmit to the emergency callers, as described below.

The data ingestion module 210 includes a call data ingestion module 212 and a supplemental data ingestion module 214. The call data ingestion module 212 receives and processes call data related to emergency calls received at PSAPs, e.g., call data received by the EDG device 144 within the PSAP 140 and transmitted to the emergency system 150 as call data signals. The call data ingestion module 212 may receive and process call data signals from other sources, such as one or more multi-tenant emergency call data relays, which may be used in combination with one or more EDG devices. In some embodiments, the EDG devices are configured to transmit data to the emergency system 150 in a common format. In other embodiments, the call data ingestion module 212 is configured to parse and reformat call data signals received from PSAPs into a common format used by the emergency system 150. The call data ingestion module 212 may determine whether each data message describes a new call or an existing call and associates call data related to the same call. The call data ingestion module 212 outputs call data to the data store 220. In some embodiments, the call data ingestion module 212 also outputs call data to one or more processing modules (e.g., one or more of the modules 230-250) for real-time processing.

The supplemental data ingestion module 214 receives and processes supplemental data signals provided by one or more supplemental data sources separate from the source of the call data, e.g., the supplemental data sources 160 and 170a-170c shown in FIG. 1. At least some of the supplemental data signals may include a location of an emergency and a phone number. The supplemental data ingestion module 214 may parse supplemental data signals and reformat the parsed supplemental data signal into a common format used by the emergency system 150. The supplemental data ingestion module 214 may determine whether each supplemental data signal is related to a prior supplemental data signal (e.g., an updated location, additional camera footage, etc.) or not, and may associate related supplemental data signals to streamline processing of follow-on data signals. The supplemental data ingestion module 214 outputs supplemental data signals to the data store 220. In some embodiments, the supplemental data ingestion module 214 also outputs supplemental data signals to one or more processing modules (e.g., one or more of the modules 230-250) for real-time processing. While a single supplemental data ingestion module 214 is shown in FIG. 2, in other embodiments, the data ingestion module 210 may multiple data ingestion modules for different supplemental data sources, e.g., one data ingestion module for each supplemental data source, or one data ingestion module for each particular data format or communication protocol used by one or more supplemental data sources.

The data store 220 provides storage of the call data signals and supplemental data signals. The data store 220 may be encrypted. In some embodiments, the emergency system 150 includes a first data store for short-term storage (e.g., for ongoing emergency calls), and a second, longer-term data store accessed to perform periodic analyses. On some embodiments, the emergency system 150 includes different data stores for call data and for supplemental data signals. The data store 220 may include one or more of a Binary Large OBject (BLOB) storage service, data warehouse, key-value database, document database, relational database, or any other type of data storage.

The signal correlation engine 230 processes call data and supplemental data signals to determine whether a supplemental data signal corresponds to a particular emergency call received at a PSAP, e.g., PSAP 140. The signal correlation engine 230 may access the call data from the data store 220, or the signal correlation engine 230 may receive new call data directly from the call data ingestion module 212. Similarly, the signal correlation engine 230 may access the supplemental data from the data store 220, or the signal correlation engine 230 may receive new supplemental data directly from the supplemental data ingestion module 214. The signal correlation engine 230 may compare a caller identifier (e.g., phone number and/or caller name) in a supplemental data signal to caller identifiers in call data signals related to emergency calls received at one or more PSAPs to determine whether a supplemental data signal corresponds to a particular emergency call. The signal correlation engine 230 may alternatively or additionally use other data fields to correlate supplemental data to call data, such as time stamps, locations, cell carrier, etc. For example, the signal correlation engine 230 may determine that if a supplemental data signal is sufficiently close in location (e.g., within the uncertainty radiuses provided by the location sources) and sufficiently close in time (e.g., within 10 seconds) to a call data signal of a given emergency call, the supplemental data signal corresponds to the emergency call. The signal correlation engine 230 may use various other rules for correlating supplemental data signals to calls. In some embodiments, the rules are user-configurable.

The tenant mapping module 240 maps supplemental data signals to particular PSAPs for which the supplemental data signals are visible. As used herein, a tenant is a subscriber to the emergency system, such as a PSAP. A tenant may also be a group of PSAPs that are assigned to the same jurisdiction and respond to calls within the jurisdiction (e.g., a state highway patrol may include multiple PSAPs that receive calls across the highway system), or other types of emergency or governmental agencies, e.g., a statewide emergency data agency that collects and analyzes emergency data but does not respond to calls. Each tenant has an associated geographic region and may be responsible for responding to emergency calls within that geographic region. The boundaries of the geographic region are represented as a geofence or a set of geofences (referred to generally as "geofence" or "geofence data"). Geofence data may be stored in the tenant mapping module 240, in the data store 220, or in another data store. The tenant mapping module 240 compares the locations of supplemental data signals to geofence data for each PSAP to determine whether the supplemental data signals are relevant to each PSAP. The tenant mapping module 240 maps a supplemental data signal to a tenant if the location indicated by the supplemental data signal falls within the geofence associated with the tenant. The tenant mapping module 240 outputs the tenant mappings to the web server 250 or to data storage accessed by the web server 250.

The web server 250 provides user interfaces to telecommunicators providing emergency response assistance. The web server 250 may provide multiple user interface (UI) modules corresponding to various UI components, e.g., a map UI 252 and a messaging UI 254. The web server 250 may provide additional UI modules not specifically shown in FIG. 2, such as a call data module, a chat module, a search module, a key questioning module, a resource selection module, etc. It should be understood that various user interface functions described herein as being performed by the web server 250 or by the user interface may be performed at the web server 250 (e.g., in a thin client implementation) or at the emergency application 148 based on data and instructions provided to the telecommunicator device 146 by the web server 250 (e.g., in a fat client implementation). The user interface may be user-configurable, and the web server 250 may select certain data or certain UI modules for display based on user selections.

The map UI 252 generates a display of a map and one or more signal indicators corresponding to data signals, e.g., call data signals for calls received at the PSAP 140, and supplemental data signals mapped to the PSAP 140 by the tenant mapping module 240. Each signal indicator is positioned on the map at the location indicated by the data signal. The signal indicators may have a visual characteristic indicating the status of a call corresponding to the signal indicator. For example, the visual characteristic may indicate whether the data signal corresponds to a call that has been received at the telecommunicator's PSAP, whether the corresponding call has been answered, or whether the corresponding call has been answered at a different PSAP. For a supplemental signal indicator that does not correspond to a call data signal, the visual characteristic of the supplemental signal indicator may indicate whether or not a threshold amount of time has elapsed since the call supplemental signal was received without a corresponding call being answered. The map UI 252 may provide additional signal data via the user interfaces, e.g., pop-up windows or other displays. Example user interfaces provided by the map UI 252 are shown in FIGS. 4-6, 8, and 9.

Figure 6:
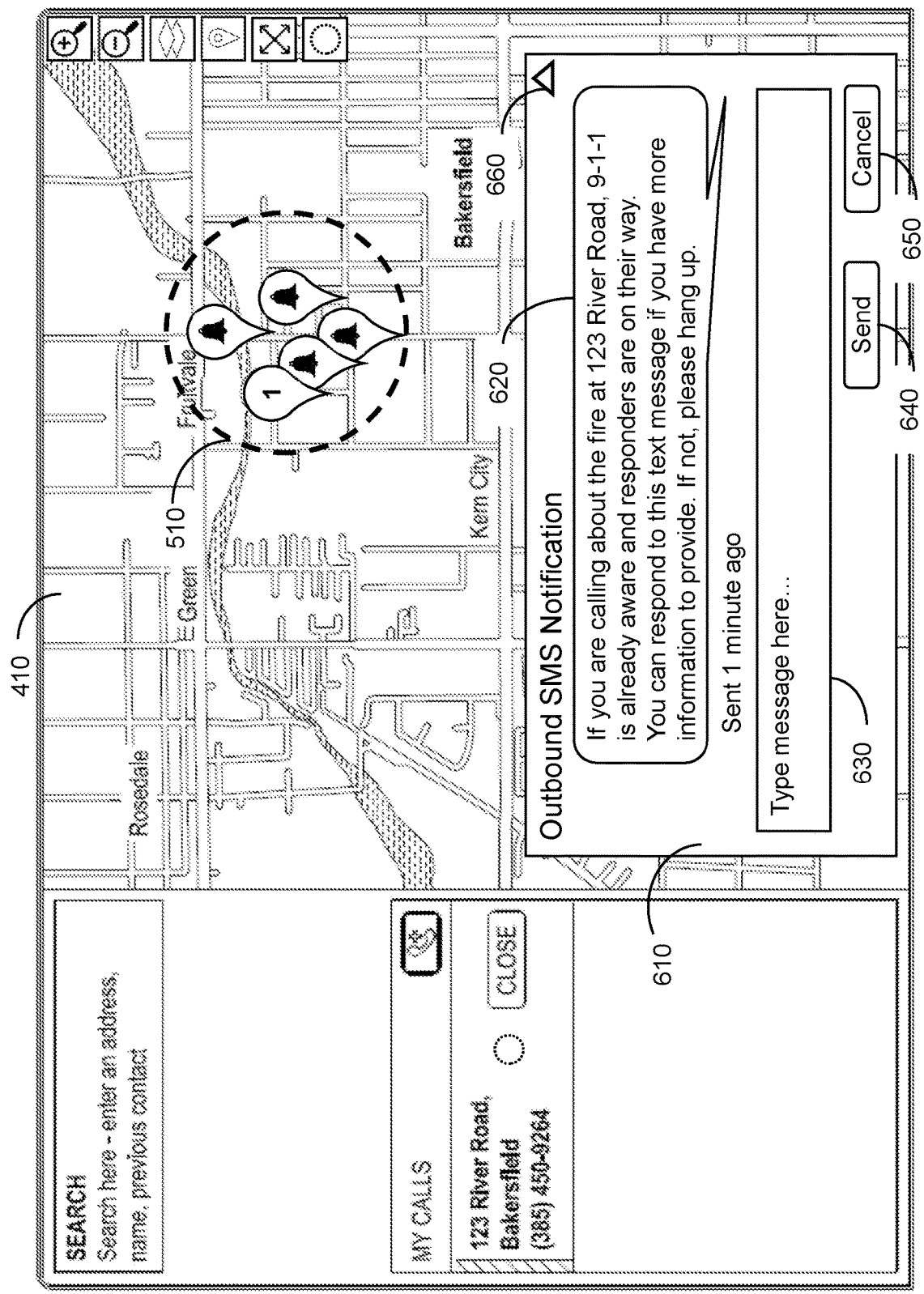
FIG. 6 is a user interface showing a user interface module for sending a text message to phone numbers of data signals inside the selected geographic region, according to some embodiments of the present disclosure.
Figure 7:
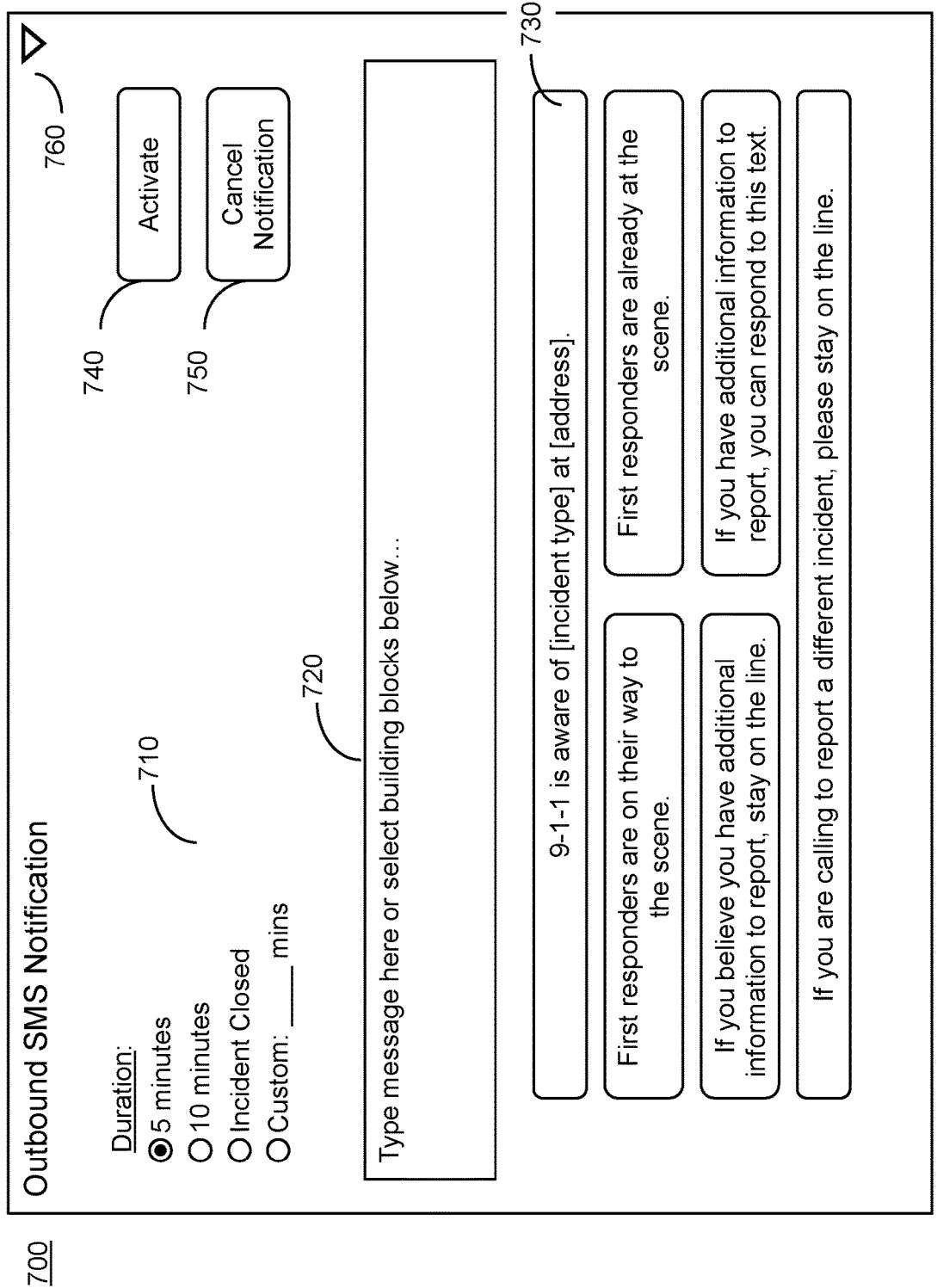
FIG. 7 is a user interface for configuring an outbound message to emergency callers, according to some embodiments of the present disclosure.
Figure 9:
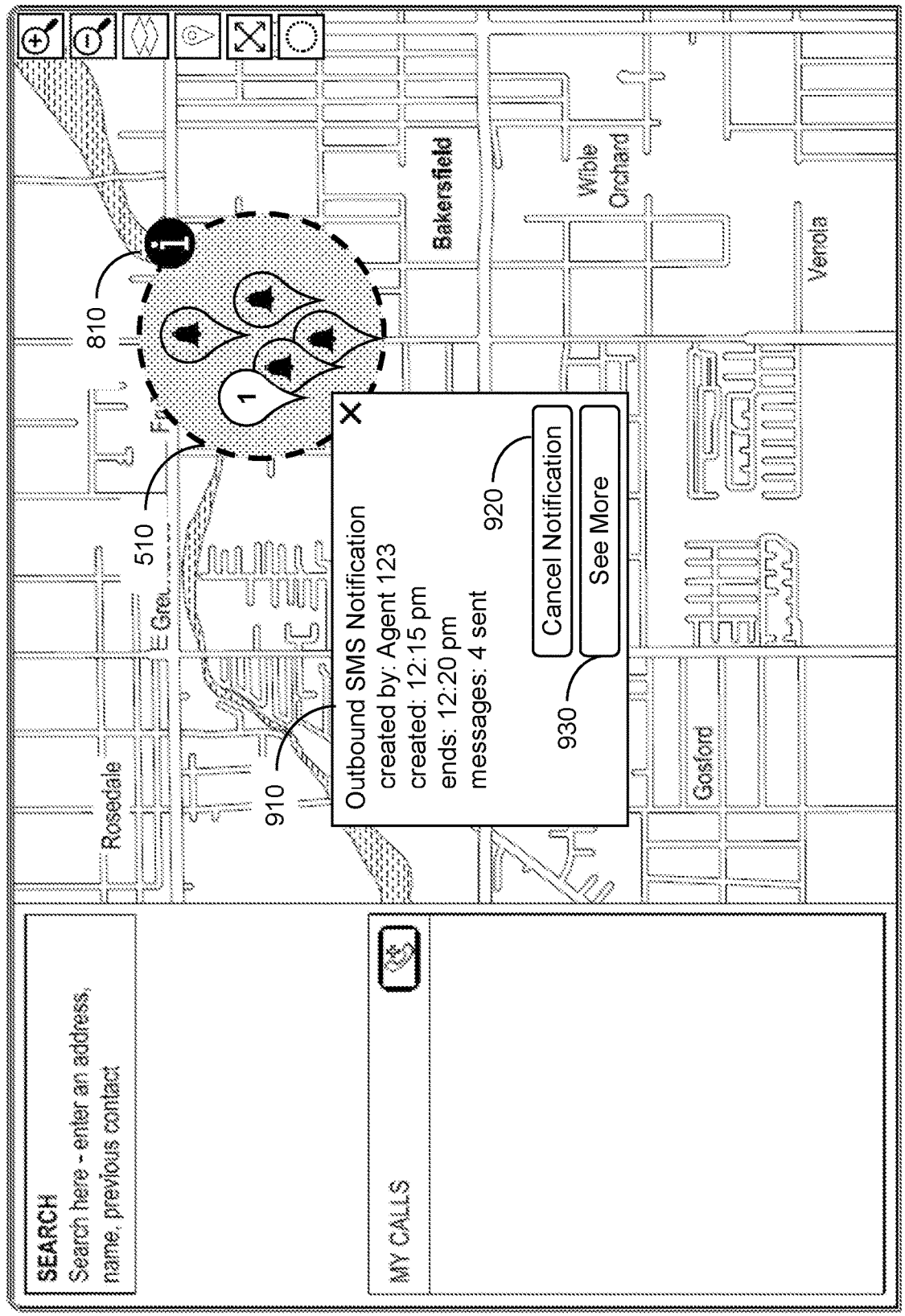
FIG. 9 is a user interface showing a detail window for the outbound message, according to some embodiments of the present disclosure.

The messaging UI 254 provides UI features that a user can use to configure and send an outbound message to phone numbers associated with a selected set of data signals, e.g., to phone numbers associated with data signals having locations in a particular geographic region. The messaging UI 254 or the map UI 252 may provide an option for a user to select a geographic region on the map. For example, the user can draw a polygon (e.g., a circle or rectangle) over a particular portion of the map that includes data signals that may be related to the same emergency or event. The messaging UI 254 provides additional options for a user to write and configure the message sent to phone numbers of the data signals within the selected geographic region. The messaging UI 254 may include one UI, or a set of UIs, displayed to a user configuring an automated message, and an additional UI or set of UIs displayed to other users, e.g., other telecommunicators in a PSAP, providing information about an automated message configured by another user. Example user interfaces provided by the messaging UI 254 are shown in FIGS. 6, 7, and 9.

The messaging interface 260 manages messages configured via users using the messaging UI 254. The messaging interface 260 receives the selected geographic region, the outbound message, and any other message configuration options from the web server 250, e.g., based on selections by a user in the messaging UI 254. The messaging interface 260 identifies phone numbers to transmit the outbound message to, and transmits the messages, e.g., via SMS. In the example shown in FIG. 2, the messaging interface 260 includes an outbound message manager 262 and an SMS interface 264. The messaging interface 260 may provide features not specifically shown in FIG. 2, such as an inbound message manager that receives inbound text messages from a mobile device user (e.g., a text response to an automated outbound message) and provides the received text messages to the web server 250 for display.

The outbound message manager 262 receives the outbound message, selected geographic region, and message configuration options selected by the user. The outbound message manager 262 also retrieves data describing data signals from the data store 220. The outbound message manager 262 compares data signals in the data store 220 to the selected geographic region and other configuration options and identifies phone numbers to transmit the outbound message to. For example, the outbound message manager 262 identifies any data signals with locations within the geographic region.

The outbound message manager 262 may apply one or more filters to the identified data signals with locations within the geographic region, so that the outbound message manager 262 does not select the filtered data signals to send the outbound message to. The outbound message manager 262 may filter the data signals to remove data signals that correspond to answered calls, e.g., the outbound message manager 262 does not select supplemental data signals that were correlated to call data signals by the signal correlation engine 230. The outbound message manager 262 may also filter data signals to remove signals that may not correspond to active emergency calls. For example, the outbound message manager 262 may filter data signals received more than a threshold time ago, e.g., more than one minute or five minutes ago; in some embodiments, the threshold time may vary based on the data source, e.g., how often the data source sends updated supplemental data to the emergency system 150. The outbound message manager 262 may filter data signals based on the data included in the data signal, e.g., filtering data signals that do not have an associated phone number. As another example, the outbound message manager 262 filters data signals based on the supplemental data source or type, e.g., the outbound message manager 262 may filter signals from some or all of the supplemental data sources 170, which do not correspond to emergency calls.

The outbound message manager 262 may continue to monitor the data store 220 for newly received data signals that are within the geographic region, and determine whether to send an outbound message to newly received data signals. The messaging UI 254 may enable a user to select an active time period for an automated message, e.g., transmit the automated message to data signals received in the next 10 minutes, or transmit the automated message to calls received while a particular incident in the geographic region is active. To determine whether to transmit the outbound message to the phone number of the new data signal, the outbound message manager 262 may determine whether a new data signal is related to a previously-received data signal (e.g., if the messaging interface 260 has already sent an outbound message to the phone number in the new the data signal), and if not, apply the filters described above.

The SMS interface 264 transmits messages to the phone numbers associated with the signals identified by the outbound message manager 262. In this example, the outbound message is an SMS message, also referred to as a text message, transmitted over a cellular network or the Internet to the phone number associated with the data signal. The outbound message may be sent using other protocols, such as Internet Protocol (IP) based messaging protocols associated with phone numbers (e.g., iMessage or WhatsApp), or messaging systems associated with other contact information (e.g., email). In other embodiments, the outbound message may be an audio message played to a caller while the caller is on hold. In some embodiments, the outbound message may be sent in multiple formats, e.g., text and audio. The messaging interface 260 may include any suitable interface or interfaces instead of or in addition to the SMS interface 264 based on the selected messaging protocol(s) and format(s).

In some embodiments, the messaging interface 260 includes an interface to a third-party service that can provide notifications to its users. For example, the messaging interface 260 may include an integration to a traffic app (e.g., Waze) to alert its users about a known traffic incident, an integration to a social media provider to alert its users about a known incident (e.g., a known mass casualty incident), or an integration to a mass notification provider to alert its users about a known incident. In some embodiments, the messaging interface 260 may filter messages provided to third party integrations, e.g., only providing traffic-related incident information to a traffic app.

Process for Sending Outbound Messages to Emergency Callers

Figure 3:
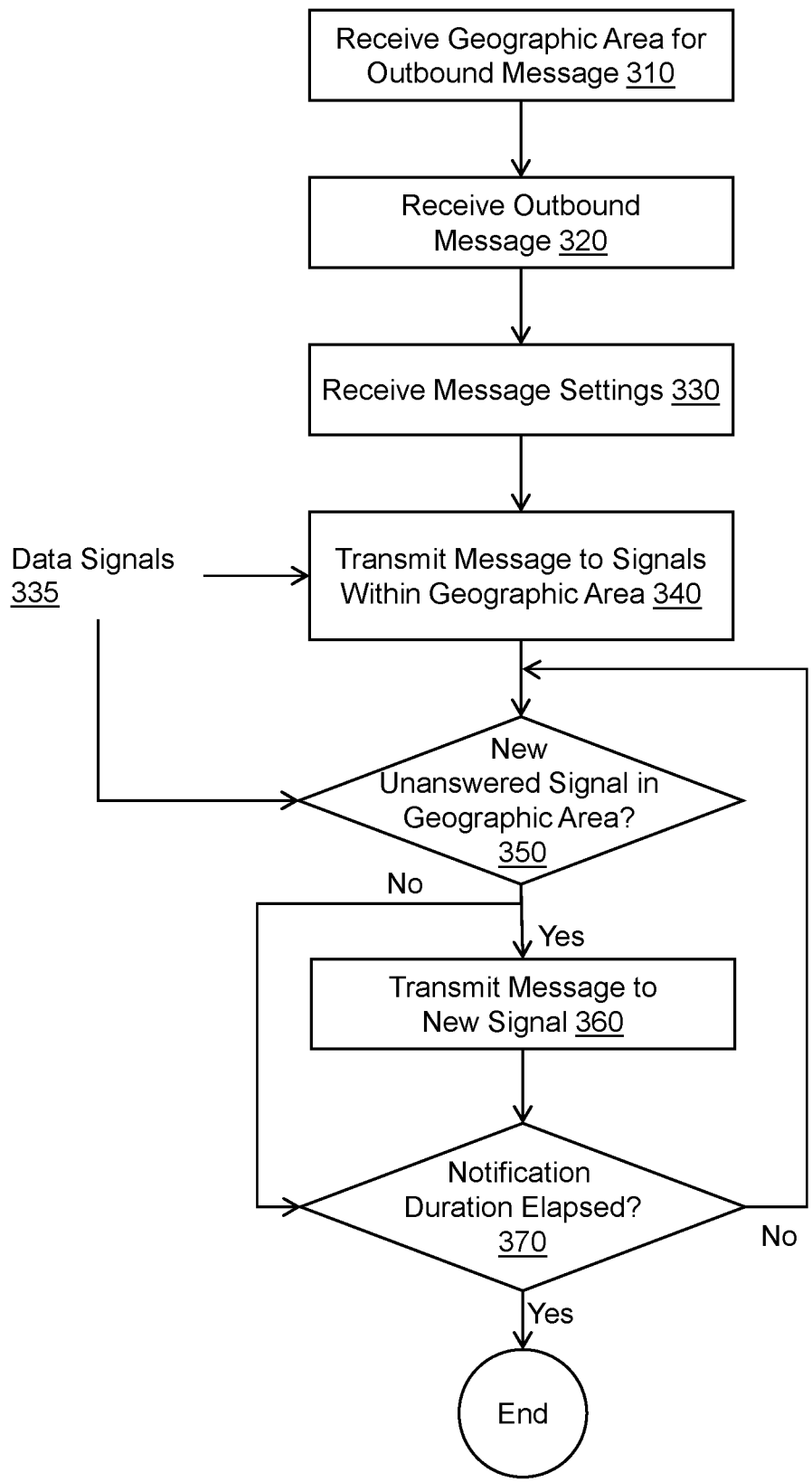
FIG. 3 is a flow diagram illustrating a process for sending outbound messages to emergency callers according to some embodiments of the present disclosure.
Figure 4:
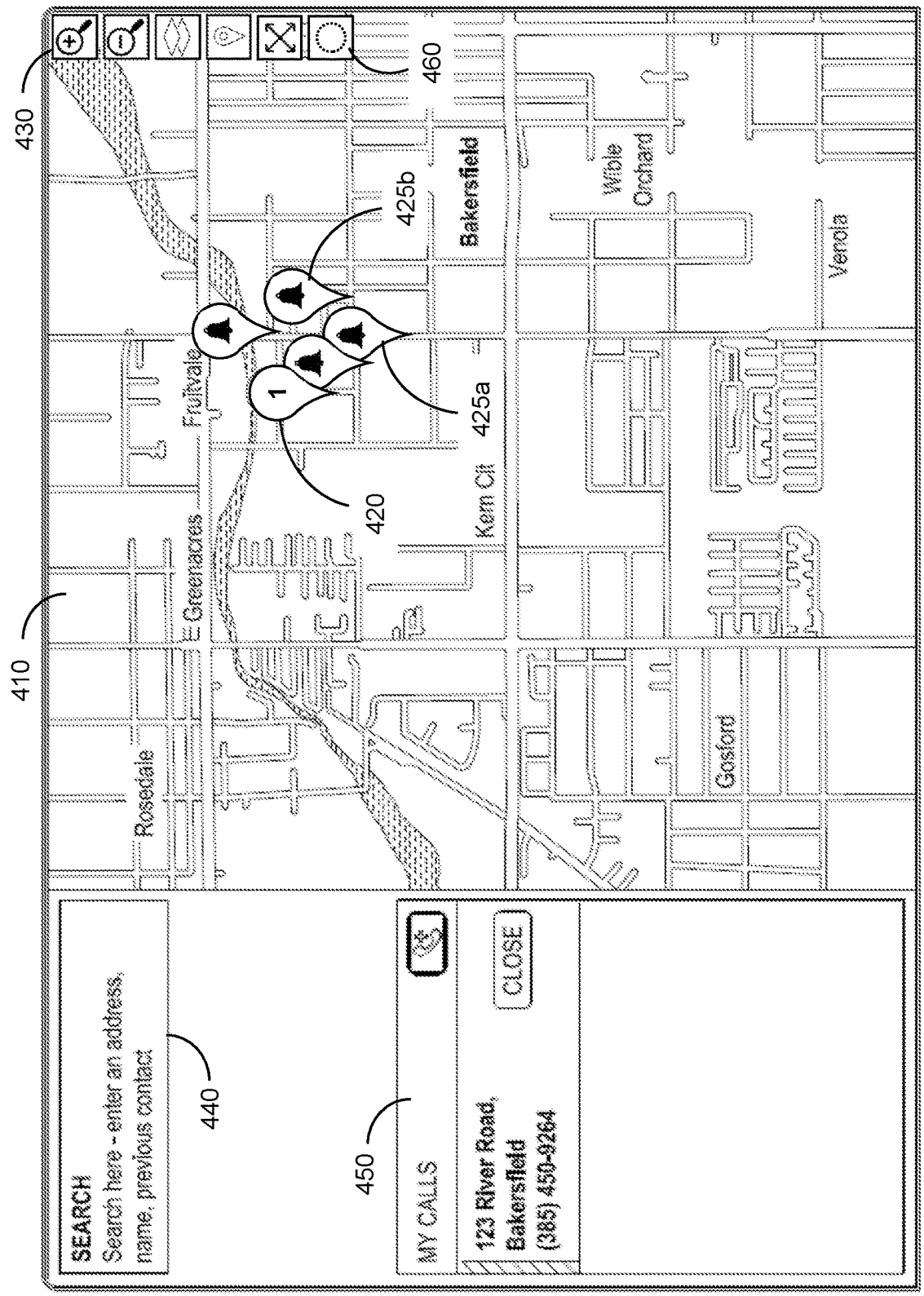
FIG. 4 is a user interface displaying data signals on a map, according to some embodiments of the present disclosure.
Figure 5:
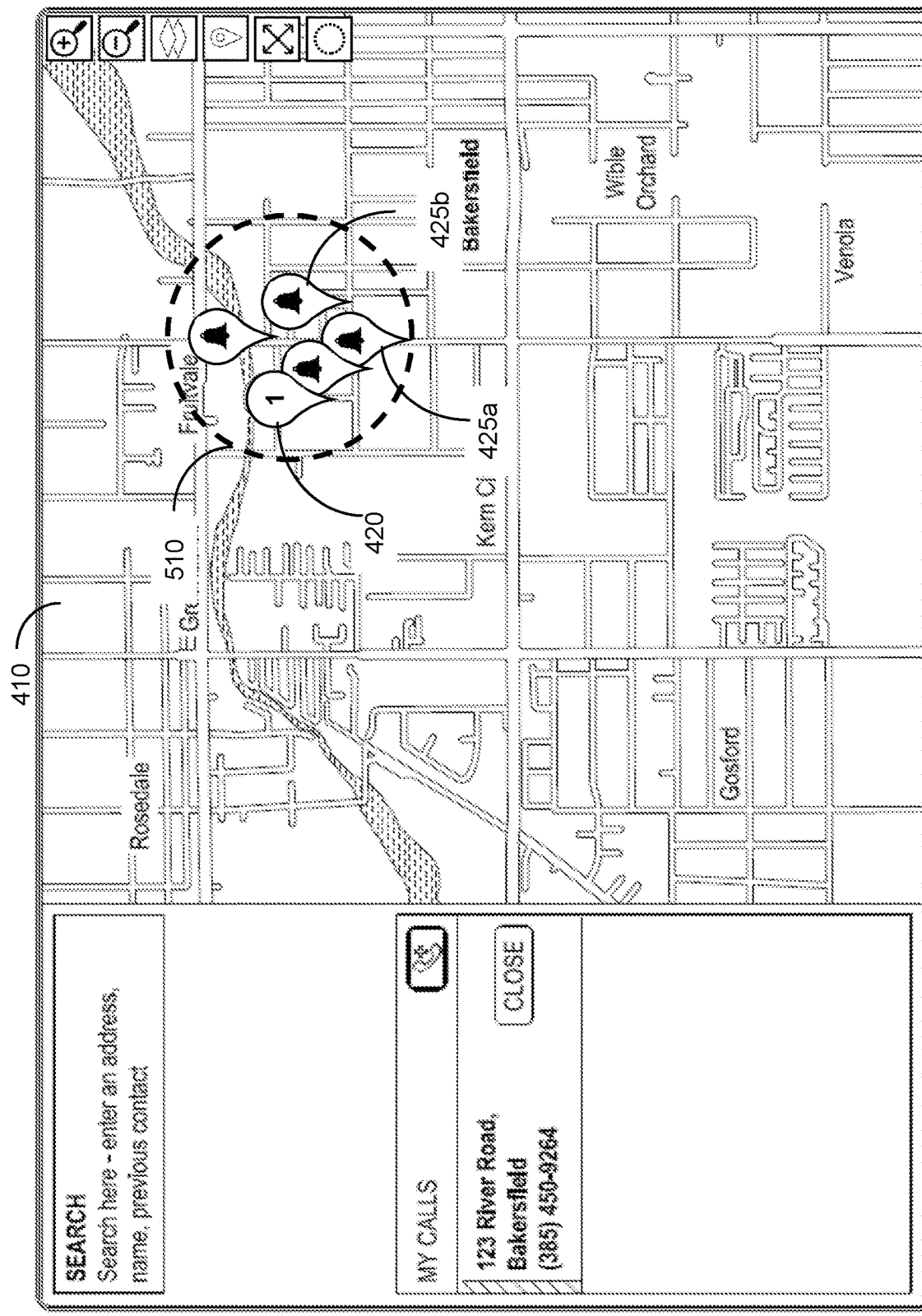
FIG. 5 is a user interface showing a user selection of a geographic region on the map, according to some embodiments of the present disclosure.

FIG. 3 is a flow diagram illustrating a process for sending outbound messages to emergency callers according to some embodiments of the present disclosure. The emergency system 150 (e.g., the map UI 252) receives a geographic area for an outbound message. For example, a telecommunicator using the emergency application 148 draws a polygon on the map UI 252, and the web server 250 returns data describing the boundaries of the polygon to the messaging interface 260. FIGS. 4 and 5, discussed below, show example interfaces in which a user selects the geographic area.

The emergency system 150 (e.g., the messaging UI 254) receives 320 an outbound message entered by a user. For example, a telecommunicator may type an outbound message into a text box in the messaging UI 254. In some embodiments, the messaging UI 254 provides selectable message segments that a user can select to generate an outbound message more efficiently. FIGS. 6 and 7, discussed below, show example interfaces in which a user enters an outbound message.

The emergency system 150 (e.g., the messaging UI 254) receives 330 message settings. For example, a telecommunicator selects a time period for which the message should be sent to new callers in the geographic area. As another example, the telecommunicator may select a set of data signals or data signal sources for the emergency system 150 to send the outbound message to. For example, if an incident in the geographic area is a car crash, the telecommunicator may choose to send the outbound message to phone numbers associated with vehicle data sources (e.g., vehicle data source 170c); alternatively, if an incident in the geographic area is a fire, the telecommunicator may choose not to send the outbound message to phone numbers associated with vehicle data sources. FIG. 7, discussed below, shows an example interface in which a user enters a message setting.

The emergency system 150 (e.g., the messaging interface 260) transmits 340 messages to signals (e.g., phone numbers associated with data signals) within the geographic area. The messaging interface 260 retrieves data describing data signals 335 from the data store 220. The messaging interface 260 identifies a portion of the data signals with locations inside the geographic area. As described with respect to FIG. 2, the outbound message manager 262 may further apply one or more filters to the data signals with locations inside the geographic area, e.g., so that the messaging interface 260 transmits the outbound message to phone numbers associated with unanswered calls, but does not transmit the outbound message to phone numbers associated with calls that have been answered by a telecommunicator.

The emergency system 150 (e.g., the messaging interface 260) continues to determine 350 whether any newly received data signals 335 are in the geographic area. For example, the data ingestion module 210 may push any new data signals or a subset of the data signals (e.g., supplemental data signals) to the outbound message manager 262, or the outbound message manager 262 may retrieve new data signals on a periodic basis (e.g., every second, or every five seconds). The outbound message manager 262 may apply any of the filtering described with respect to FIG. 2, including filtering phone numbers that have previously been sent the outbound message.

If the emergency system 150 detects a new signal to transmit a message to (e.g., a new data signal in the geographic area that is not filtered out by the outbound message manager 262), the emergency system (e.g., the SMS interface 264) transmits 360 the outbound message to the new signal (e.g., phone numbers associated with data signals) in a similar manner that the messaging interface 260 transmits the initial outbound messages.

The emergency system 150 determines 370 whether a notification duration has elapsed, e.g., a notification duration configured by a telecommunicator. As noted above, the notification duration may be a time period, or it may be tied to a particular event in the emergency system 150, such as closing of a particular incident. If the notification duration has not elapsed, the process returns to decision 350, determining whether any new signals in the geographic area have been received. If the notification duration has elapsed, the process ends.

Example User Interfaces

FIG. 4 is a user interface displaying data signals on a map according to some embodiments of the present disclosure. The user interface includes a map 410 with various streets and place names. An answered call signal indicator 420 is positioned on the map 410 at the location indicated by a call data signal. Multiple unanswered signal indicators 425 are positioned on the map 410 at the locations indicated by supplemental data signals, e.g., locations of unanswered emergency calls provided by the mobile device data provider 160. The unanswered signal indicators 425 may have a particular color or shading indicating that they are supplemental data signal not presently associated with a received call. In addition, in this example, the signal indicators 425 have an alarm icon that indicates that their corresponding data signal were received at least a threshold amount of time ago, e.g., that the callers have been on hold without their call being answered for this duration of time.

The user interface has additional interface components that may be used by the telecommunicator. In this example, the map includes a set of map options 430 that can be selected to adjust the display of the map 410, e.g., options to change the zoom level, options to change the region shown, options to change the type of data that is shown on the map 410, etc. The user interface also includes a search bar 440 that can accept search terms from a telecommunicator to search for data related to current or completed calls stored on the emergency system 150. The user interface further includes a list of My Calls 450, which are calls currently being handled by the telecommunicator. In this case, the My Calls list 450 includes the call corresponding to the answered call signal indicator 420.

One of the options 430 is a message polygon option 460, which allows a user to select a geographic area for sending an outbound message. If the user selects the message polygon option 460, the map UI 252 may provide a UI feature for the user to draw a polygon directly on the map 410.

FIG. 5 is a user interface showing a user selection of a geographic region on the map, according to some embodiments of the present disclosure. A user has drawn the message polygon 510 around the unanswered signal indicators 425 and in the area around the answered call 420. In this example, the message polygon 510 is a circle, but other shapes, e.g., a rectangle, a square, a hexagon, etc., may be used. In some embodiments, after the user selects the message polygon option 460, the map UI 252 displays selectable polygon options for different polygon shapes, and the user can select a particular shape. In some embodiments, the map UI 252 may provide a freeform option, so that a user can create a freeform shape, or select a set of points on the map 410 to form a polygon.

FIG. 6 is a user interface showing a user interface module for sending a text message to phone numbers of data signals inside the selected geographic region, according to some embodiments of the present disclosure. The messaging UI 254 may provide the outbound SMS notification window 610 overlaid over the map 410 after the user creates the polygon 510. The outbound SMS notification window 610 includes a message history 620, showing the outbound message entered by the user, along with a text box 630 where the user can type the message or type a follow-on message, a send button 640 that the user can select to send the message, and a cancel button 650 that user can select to cancel the outbound SMS notification. The outbound SMS notification window 610 further includes an expand option 660 that a user can select to view more outbound notification options.

FIG. 7 is a user interface 700 for configuring an outbound message to emergency callers, according to some embodiments of the present disclosure. The messaging UI 254 may display the user interface 700 in response to a user selecting the expand option 660, or in response to the user drawing the polygon 510. The user interface 700 may be overlaid over the map 410 (e.g., a larger portion of the map than is overlaid by the outbound SMS notification window 610), or the web server 250 may display the user interface 700 in lieu of the map 410 or in a separate window.

The user interface 700 includes a duration selection panel 710 which the user may use to select a duration for the message to be sent to new data signals. Below the duration selection panel 710 is a message entry box 720 in which the user can type the outbound message. Alternatively, the user may select pre-written message building blocks 730 below the message entry box 720; if the user selects a message building block 730, the text of the building block is entered into the message entry box 720. In some embodiments, the messaging UI 254 selects one or more message building blocks to include based on the incident. For example, if the incident within message polygon 510 is a fire, a message building block referring to a fire may be included. In some embodiments, certain details are added into the message building blocks automatically. For example, the messaging UI 254 may pull the incident type and incident address from an incident record created by the emergency system and add this to the message "9-1-1 is aware of [incident type] at [address]"; e.g., the message building block may say "9-1-1 is aware of the fire at 123 River Road."

The user interface 700 further includes an option 740 to activate the outbound message after the user has finished creating the outbound message and selected the duration 710 and any other settings that may be included in the user interface 700. Below the activate option 740 is a cancel notification option 750 that the user can select to cancel the outbound message. The user interface 700 further includes a reduce option 760 that the user can select to reduce the user interface 700, e.g., to return to the outbound SMS notification window 610.

Figure 8:
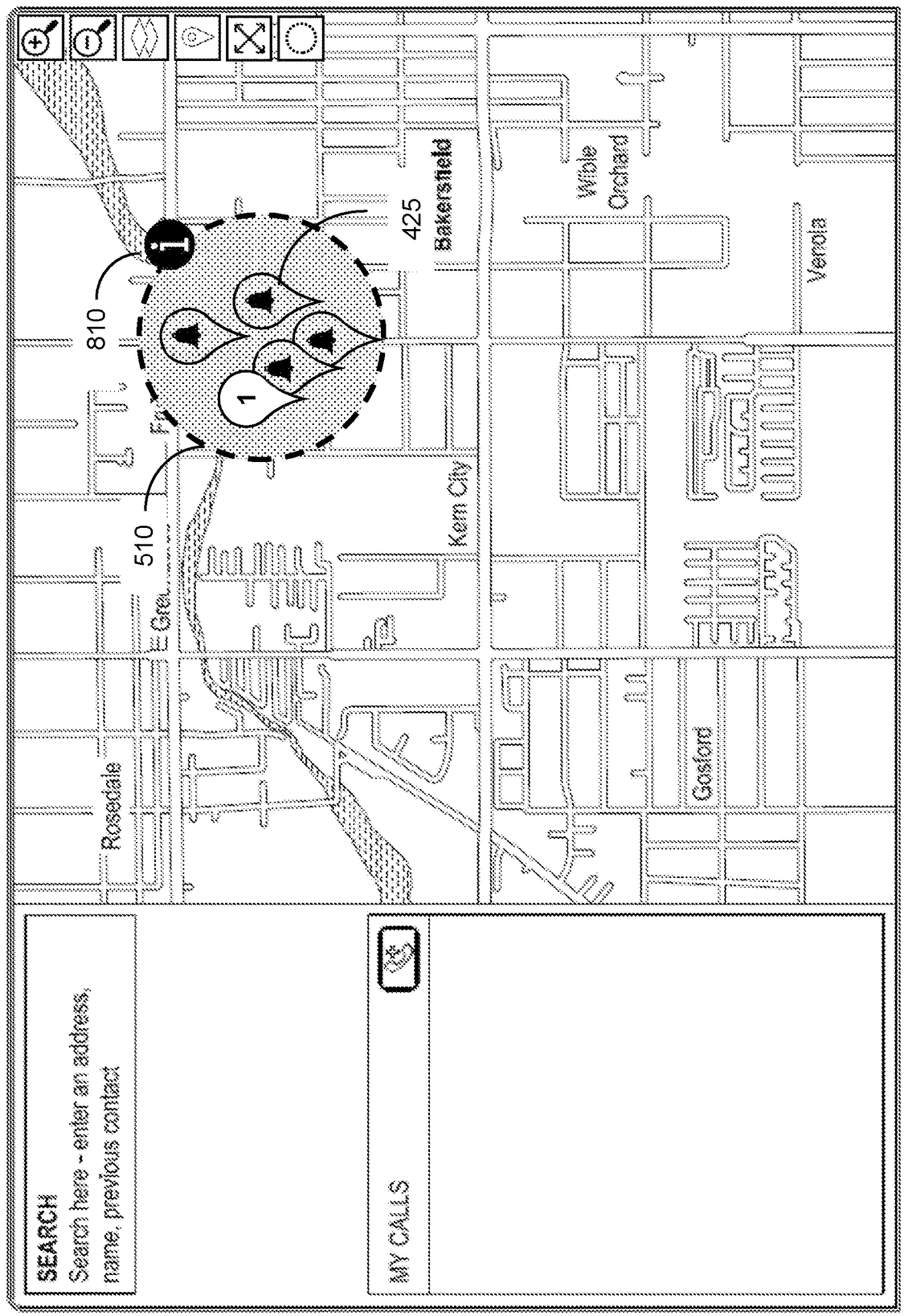
FIG. 8 is a user interface showing the map after the outbound message has been configured, according to some embodiments of the present disclosure.

FIG. 8 is a user interface showing the map after the outbound message has been configured, according to some embodiments of the present disclosure. The message polygon 510 and the unanswered signal indicators 425 are shaded, indicating that the message has been sent to unanswered data signals within the geographic region bounded by the message polygon 510. The user interface further includes an information option 810 that the user can select to view more details about the outbound message. The user interface shown in FIG. 8 may be displayed to a different user than the user who configured the outbound message. For example, if a PSAP has multiple telecommunicators working simultaneously on different telecommunicator devices 146, each of the telecommunicators' respective emergency applications 148 provides about an outbound message set up by one of their colleagues (or that they themselves configured).

FIG. 9 is a user interface showing a detail window for the outbound message, according to some embodiments of the present disclosure. The detail window 910 is displayed near the message polygon 510 in response to a user selecting the information option 810. The detail window 910 includes various details about the outbound message, including which user initiated the outbound message, when the message was created, when the notification duration ends, and how many outbound messages have been sent. In other examples, more or different information may be displayed, such as information describing responses to the outbound message. The detail window 910 further includes an option 920 that a user may select to cancel the outbound message. In some embodiments, any user within the PSAP may be able to cancel the outbound message. The detail window 910 also includes an option 930 that the user may select to view more information about the outbound message, e.g., the text of the outbound message, message histories with callers who have responded to the message, etc.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

What is claimed is:

1. An emergency system for sending outbound messages, the system comprising:
   a data ingestion module to receive a first data signal comprising a first location and a first phone number and a second data signal comprising a second location and a second phone number, the first data signal corresponding to an unanswered emergency call that is on hold and the second data signal corresponding to an answered emergency call;
   a web server to:
      provide a user interface comprising a map and a signal indicator, the signal indicator positioned on the map at the first location; and
      receive a user selection of a geographic region on the map; and
   a messaging interface to:
      receive the selected geographic region from the web server, the selected geographic region associated with a message;
      determine that the first location and second location are inside the selected geographic region;
      determine that the first data signal corresponds to an unanswered emergency call and the second data signal corresponds to an answered emergency call; and
      transmit the message to the first phone number associated with the data signal corresponding to the unanswered emergency call associated with the selected geographic region, the message being transmitted while the unanswered emergency call is on hold;
      wherein the message is not transmitted to the second phone number based on the determination that the second data signal corresponds to the answered emergency call.

2. The system of claim 1, wherein the first data signal is one of a plurality of data signals received by the data ingestion module, a portion of the plurality of data signals having locations inside the selected geographic region, and the messaging interface is configured to transmit the message to at least a subset of the portion of the plurality of data signals having locations inside the selected geographic region.

3. The system of claim 1, wherein the messaging interface is configured to transmit the message as a short message service (SMS) message.

4. The system of claim 1, wherein the web server is further to receive the message from the user.

5. The system of claim 1, wherein the web server is further to provide, in the user interface, a plurality of selectable message segments, and the message comprises at least one of the message segments selected by the user.

6. The system of claim 1, wherein the data ingestion module is to receive a third data signal comprising a third location and a third phone number after the web server receives the user selection of the geographic region, and the messaging interface is to:
   determine that the third location is inside the selected geographic region; and
   transmit the message to the third phone number.

7. The system of claim 6, wherein the message is associated with a notification time period, and messaging interface is further to determine that the third data signal arrived before the notification time period elapsed.

8. A method for sending outbound messages from an emergency system, the method comprising:
   receiving a first data signal comprising a first location and a first phone number and a second data signal comprising a second location and a second phone number, the first data signal corresponding to an unanswered emergency call that is on hold and the second data signal corresponding to an answered emergency call;
   providing a user interface comprising a map and a signal indicator, the signal indicator positioned on the map at the first location;
   receiving a user selection of a geographic region on the map;
   receiving a message associated with the geographic region;
   determining that the first location and second location are inside the selected geographic region;
   determining that the first data signal corresponds to an unanswered emergency call and the second data signal corresponds to an answered emergency call; and
   transmitting the message to the first phone number associated with the first data signal corresponding to the unanswered emergency call associated with the selected geographic region, the message being transmitted while the unanswered emergency call is on hold;
   wherein the message is not transmitted to the second phone number based on the determination that the second data signal corresponds to the answered emergency call.

9. The method of claim 8, wherein the first data signal is one of a plurality of data signals, a portion of the plurality of data signals having locations inside the selected geographic region, the method further comprising:
   identifying at least a subset of the portion of the plurality of data signals having locations inside the selected geographic region; and
   transmitting the message to phone numbers associated with the subset of the portion of the plurality of data signals.

10. The method of claim 8, wherein the message is a short message service (SMS) message.

11. The method of claim 8, further comprising:
    providing, in the user interface, a plurality of selectable message segments; and
    receiving a user selection of one of the plurality of selectable message segments, wherein the message associated with the geographic region comprises the selected message segment.

12. The method of claim 8, further comprising:
    receiving a third data signal comprising a third location and a third phone number after receiving the user selection of the geographic region;
    determining that the third location is inside the selected geographic region; and
    transmitting the message to the third phone number.

13. The method of claim 12, wherein the message is associated with a notification time period, the method further comprising:
    determining that the third data signal arrived before the notification time period elapsed.

14. A non-transitory computer-readable storage medium storing instructions that, when executed by a processor, cause the processor to:
    receive a first data signal comprising a first location and a first phone number and a second data signal comprising a second location and a second phone number, the first data signal corresponding to an unanswered emergency call that is on hold and the second data signal corresponding to an answered emergency call;

provide a user interface comprising a map and a signal indicator, the signal indicator positioned on the map at the first location;

receive a user selection of a geographic region on the map;

receive a message associated with the geographic region;

determine that the first location and second location are inside the selected geographic region;

determine that the first data signal corresponds to an unanswered emergency call and the second data signal corresponds to an answered emergency call; and transmit the message to the first phone number associated with the first data signal corresponding to the unanswered emergency call associated with the selected geographic region, the message being transmitted while the unanswered emergency call is on hold;

wherein the message is not transmitted to the second phone number based on the determination that the second data signal corresponds to the answered emergency call.

15. The computer-readable storage medium of claim 14, wherein the first data signal is one of a plurality of data signals, a portion of the plurality of data signals having locations inside the selected geographic region, and the instructions further cause the processor to:

identify at least a subset of the portion of the plurality of data signals having locations inside the selected geographic region; and transmit the message to phone numbers associated with the subset of the portion of the plurality of data signals.

16. The computer-readable storage medium of claim 14, wherein the instructions further cause the processor to:

provide, in the user interface, a plurality of selectable message segments; and receive a user selection of one of the plurality of selectable message segments, wherein the message associated with the geographic region comprises the selected message segment.

17. The computer-readable storage medium of claim 14, wherein the instructions further cause the processor to:

receive a third data signal comprising a third location and a third phone number after receiving the user selection of the geographic region;

determine that the third location is inside the selected geographic region; and transmit the message to the third phone number.

\* \* \* \* \*